United States Patent
Lutz et al.

(10) Patent No.: US 12,114,199 B2
(45) Date of Patent: Oct. 8, 2024

(54) MULTIPLE-STEP DATA THROTTLING DURING DATA TRANSFER

(71) Applicant: Connectify, Inc., Philadelphia, PA (US)

(72) Inventors: Brian Lutz, Philadelphia, PA (US); Alexander Gizis, Philadelphia, PA (US); Kevin Cunningham, Swarthmore, PA (US); Brian Prodoehl, Plymouth Meeting, PA (US)

(73) Assignee: CONNECTIFY, INC., Philadelphia, PA (US)

( * ) Notice: Subject to any disclaimer, the term of this patent is extended or adjusted under 35 U.S.C. 154(b) by 96 days.

(21) Appl. No.: 17/458,526

(22) Filed: Aug. 26, 2021

(65) Prior Publication Data

US 2022/0070717 A1   Mar. 3, 2022

Related U.S. Application Data

(60) Provisional application No. 63/070,866, filed on Aug. 27, 2020.

(51) Int. Cl.
*H04W 28/02* (2009.01)
*H04L 9/40* (2022.01)
*H04L 43/0876* (2022.01)
*H04L 43/16* (2022.01)
*H04W 24/08* (2009.01)

(52) U.S. Cl.
CPC ..... *H04W 28/0231* (2013.01); *H04L 43/0876* (2013.01); *H04L 43/16* (2013.01); *H04L 63/0272* (2013.01); *H04W 24/08* (2013.01)

(58) Field of Classification Search
CPC .............. H04W 28/0231; H04W 24/08; H04L 43/0876; H04L 43/16; H04L 63/0272
USPC ......................................................... 370/252
See application file for complete search history.

(56) References Cited

U.S. PATENT DOCUMENTS

| | | | |
|---|---|---|---|
| 7,389,537 B1* | 6/2008 | Callon ................ | H04L 63/1458 713/153 |
| 2012/0108200 A1* | 5/2012 | Rubin .................... | H04W 28/02 455/509 |
| 2014/0248852 A1* | 9/2014 | Raleigh ............... | H04W 12/068 455/566 |
| 2016/0088570 A1* | 3/2016 | Cui ........................ | H04W 52/18 370/311 |
| 2017/0178193 A1* | 6/2017 | Jagannath .............. | G06Q 30/04 |
| 2017/0346762 A1* | 11/2017 | Lapidous ................ | H04L 1/187 |
| 2018/0279175 A1* | 9/2018 | Gholmieh ........... | H04L 47/6215 |
| 2021/0392557 A1* | 12/2021 | Mallikarjunan ...... | H04W 48/18 |

\* cited by examiner

*Primary Examiner* — Xuan Lu
(74) *Attorney, Agent, or Firm* — Kamran Emdadi

(57) ABSTRACT

An example method of operation may include exchanging data between a client device and a server at a first transmission rate via at least one of a first channel and a second channel, monitoring an amount of data exchanged, comparing the amount of data exchanged to a first data amount threshold and a second data amount threshold for at least one time period, partially limiting subsequent transfers of data between the client device and the server when the first data amount threshold is reached in the at least one time period, and further partially limiting the subsequent transfers of data or ending transfer of data between the client device and the server when the second data amount threshold is reached in the at least one time period.

17 Claims, 8 Drawing Sheets

700

| DATA TYPE | THRESHOLD | THROTTLE | CONTINUOUS | HOST NAME | DOMAIN NAME | IP ADDRESS | PORT | SNI |
|---|---|---|---|---|---|---|---|---|
| REALTIME STREAM | 1 | YES | | | | | | |
| DATA SERVICE #1 | 2 | YES | | | | | | |
| DATA SERVICE #2 705 | 2 710 | YES 715 | | | | | | |

FIG. 7

MULTIPLE-STEP DATA THROTTLING DURING DATA TRANSFER

CROSS-REFERENCE TO RELATED APPLICATION

This non-provisional patent application claims priority to U.S. provisional application No. 63/070,866 entitled, "METHOD AND APPARATUS FOR MULTIPLE-STEP THROTTLING DURING DATA TRANSFER," filed on Aug. 27, 2020 the entire contents of which is hereby incorporated by reference in its entirety.

BACKGROUND

Computers can communicate with one another when connected together using some form of a communications medium (such as a network). The Internet is one such network, and has the distinct advantage of being able to connect computers together from anywhere in the world. Another communications network is local area networks ("LAN"), which are private networks that typically exist between only a few trusted computers, usually in an office or home. A further example of a computer communications network is a wide area network ("WAN"), which is usually used for communications access to the Internet via a wireless radio protocol.

There are many possible reasons to want remote computers to join a LAN. A LAN itself is often secure, it may contain or have access to important corporate resources at the office, or access to one's personal media or data files in a residential setting. However, once a user attaches to a LAN via a direct Internet connection, the LAN is no longer secure. For this reason, the Virtual Private Network ("VPN") was created. The VPN may operate as software that appears to be another LAN adapter, but uses encryption technology, Internet connections, and other functionality to bridge remote computers onto a local area network, without risk of directly connecting the LAN to the public and insecure Internet.

FIG. 1 illustrates a conventional Virtual Private Network 100. In such a network, predefined or rolling algorithms allow a secure connection between a computer (client) device 102 and a remote server 160. This connection is made over any network 140, which may also be the Internet, with security managed by the VPN layer on the VPN server 150. Any software applications 110 on the client computer 102 will engage the VPN layer as a VPN client 120, appearing no different than the driver for a physical network interface. The VPN client 120 encapsulates 122 all traffic sent to it (in some cases as encrypted, private data), and then sends the data via a standard network interface and driver 121 to a physical network interface device, such as a Wi-Fi or Ethernet device. From there, the data may travel to Internet 140 via LAN 130 and ISP 135.

A single ISP is shown handling both cellular access and a LAN, although this is merely exemplary. For example, respectively different ISPs may be used for cellular access and the LAN.

The VPN data may be secure over the Internet 140, using encryption, and is subsequently sent to VPN server 150. VPN server 150 may decapsulate (e.g. decrypt) the data received from the VPN client via decapsulate/encapsulate module 152 before sending the decrypted data to remote server 160. Remote server 160 may transmit a response to VPN server 150, which may be encrypted and sent to computer 102 where that data is decrypted before being provided to the user interface).

In operation, client applications 110 communicates over Internet 140 with multiple servers, including server 160. Server 150 may provide client device 102 with streaming content while another server may provide client device 102 with non-streaming content, such as the download of a static webpage. Client device 102 transmits requests for data from server 160 via optional LAN 130, ISP 135 and/or Internet 140. Server 160 (and other servers) responds to data requests via Internet 140.

SUMMARY

A method of transmitting data between a client and a server comprises enabling the data to be transmitted between the client and the server at a first transmission rate, storing a first data amount threshold and second data amount threshold for at least one time period, partially limiting transfer of the data between the client and the server when the first data amount threshold is reached in the at least one time period, and further partially limiting transfer of the data or ending transfer of the data between the client and the server when the second data amount threshold is reached in the at least one time period.

An example embodiment may include a method that includes include exchanging data between a client device and a server at a first transmission rate via at least one of a first channel and a second channel, monitoring an amount of data exchanged, comparing the amount of data exchanged to a first data amount threshold and a second data amount threshold for at least one time period, partially limiting subsequent transfers of data between the client device and the server when the first data amount threshold is reached in the at least one time period, and further partially limiting the subsequent transfers of data or ending transfer of data between the client device and the server when the second data amount threshold is reached in the at least one time period.

Another example embodiment may include a system that includes a client device, and a server, the client device is configured to exchange data with a server at a first transmission rate via at least one of a first channel and a second channel, monitor an amount of data exchanged, compare the amount of data exchanged to a first data amount threshold and a second data amount threshold for at least one time period, partially limit subsequent transfers of data between the client device and the server when the first data amount threshold is reached in the at least one time period, and further partially limit the subsequent transfers of data or ending transfer of data between the client device and the server when the second data amount threshold is reached in the at least one time period.

Still another example embodiment may include a non-transitory computer readable storage medium configured to store instructions that when executed cause a processor to perform exchanging data between a client device and a server at a first transmission rate via at least one of a first channel and a second channel, monitoring an amount of data exchanged, comparing the amount of data exchanged to a first data amount threshold and a second data amount threshold for at least one time period, partially limiting subsequent transfers of data between the client device and the server when the first data amount threshold is reached in the at least one time period, and further partially limiting the subsequent transfers of data or ending transfer of data between the client device and the server when the second data amount threshold is reached in the at least one time period.

BRIEF DESCRIPTION OF THE DRAWINGS

FIG. 7 is a diagram that illustrates an exemplary data structure for controlling and throttling data.

DETAILED DESCRIPTION

Figure 1:
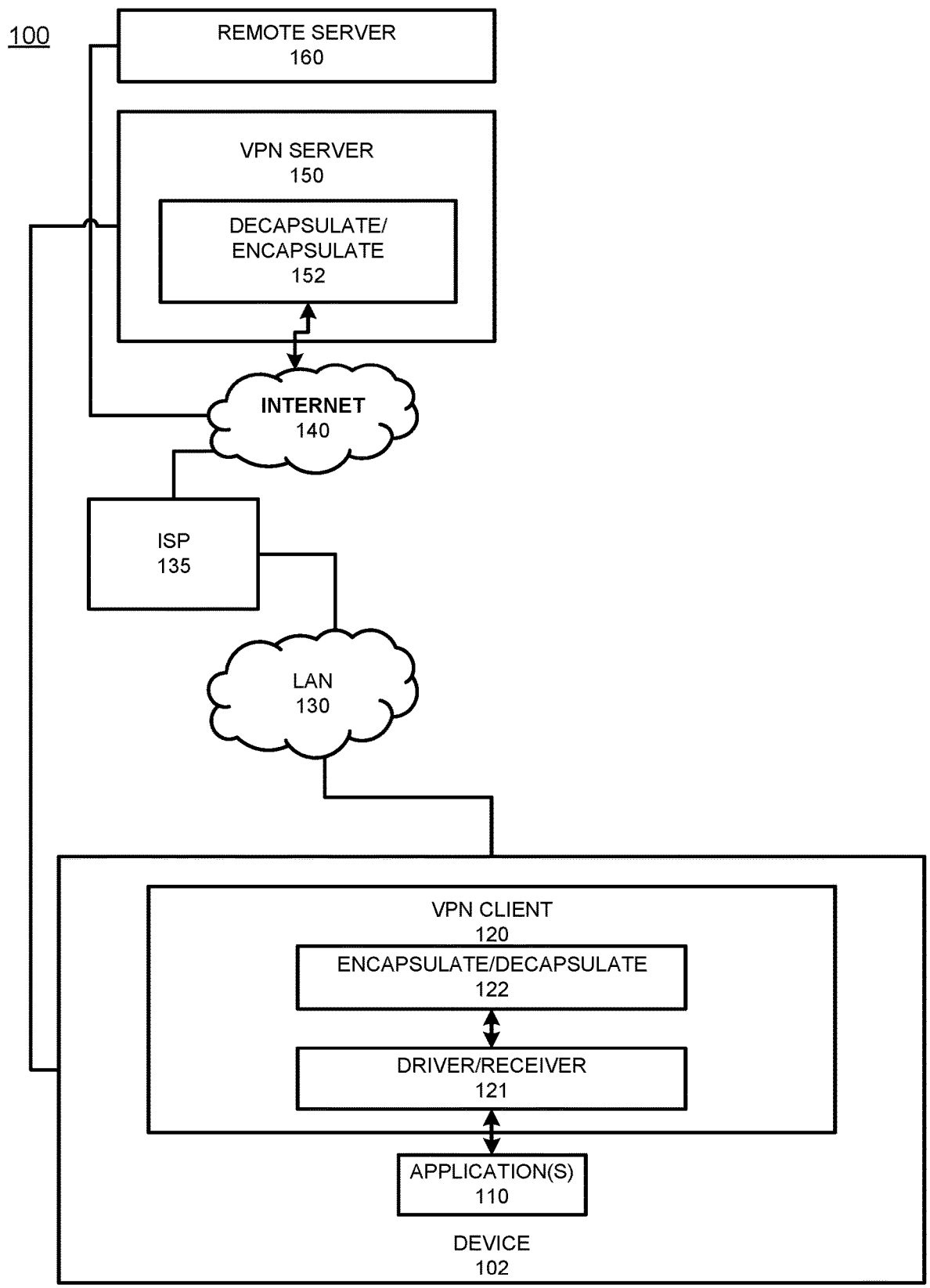
FIG. 1 is a block diagram of a communication system that communicates with a VPN server in accordance with the prior art.
Figure 2:
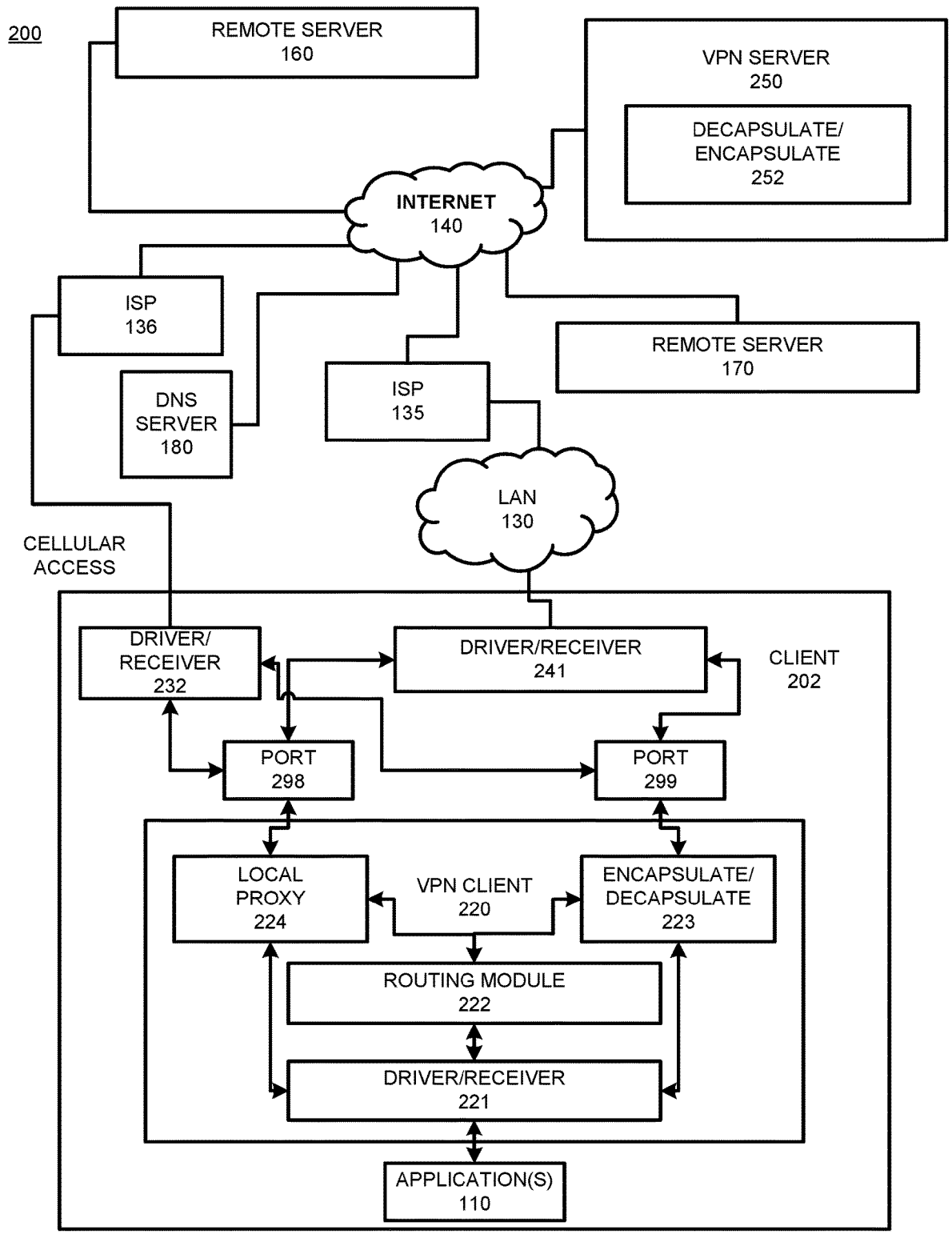
FIG. 2 is a block diagram of a communication system that communicates with a VPN server according to example embodiments.

FIG. 2 is a block diagram that illustrates a communication system 200 in accordance with one or more exemplary embodiments of the present invention.

Generally speaking, communication system 200 includes client device 202 (client) and remote server 160. Client 202 may be, for example, a mobile communications device. Remote server 160 is a source of data that is desired by client 202. Remote server 160 may be any source of data. In one or more exemplary embodiments of the present invention, remote server 160 is a source of video streaming. Various video streaming providers that provide video streaming services are known including NETFLIX, HULU, etc., which are registered trademarks of their respective owners. Thus, in one example, client 202 desires to receive video content from a video streaming provider.

Communication system 200 further includes a virtual private network (VPN). In addition to client 202 communicating with remote server 160, client 202 also wishes to communicate with a source of data via a VPN server 250. The VPN 250, for example, provides data encapsulation (which may or may not include data encryption via Encapsulate/Decapsulate module 252). One exemplary use of a VPN is to provide secure, encrypted data. Thus, client 202 wishes to communicate with remote server 160 as well as to communicate over a VPN 250.

The above objective, to communicate with remote server 160 as well as to communicate over a VPN 250 may take several forms. In one form, communication with remote server 160 is outside of the VPN, while further communication takes place with the VPN 250. The communication that takes place with the VPN 250 may be with remote server 160 or with another remote server 170. In another example, communication with remote server 160 may be over a VPN while additional communication occurs with a VPN (the same VPN that is communicating with remote server 160 or different VPN). In the explanation set forth below, communication with remote server 160 is outside of a VPN while communication to remote server 160 or to additional remote server 170 occurs with a VPN, but this is merely an example.

It is known that client 202 may transmit a request to remote server 160 (via Internet 140) so that remote server 160 responds by streaming data to client 202 (via Internet 140). In addition, client 202 may be using VPN 250 to communicate over a wide area network such as Internet 140. It is also known that if certain popular video streaming providers detect they are being requested to stream data from a VPN, they will automatically block the request. This is because some video streaming providers do not wish to transmit their streaming data over a VPN. The reason that providers do not wish to transmit their streaming data over a VPN is explained below.

Video streaming providers provide content (such as movies) on a regional basis. This is because video streaming providers may be licensed to stream content (e.g., movies) in one geographic region but may not be licensed to stream content in another geographic region. One way in which a video streaming provider determines the geographic region that has requested the streaming data is by identifying the IP address from the source that made the request. By identifying the IP address, the source of streaming video data can determine the geographic region from which the request for the streaming data originated. If (for example) a specific movie has geographic region licensing restrictions, the video streaming provider can determine whether it is licensed to stream that movie in the geographic region from which the request for the streaming data originated. Some users attempt to get around these licensing restrictions by using a VPN. When a user uses a VPN to request streaming data, the IP address associated with the VPN is typically different than the IP address associated with the user that is requesting the streaming data. Also, VPN servers can be in many different countries (and with associated IP addresses). Thus, if video streaming provider is not licensed to provide the data to the user in the user's actual geographic region (as identified by the user's IP address), the user can try to reach the video streaming provider via a VPN server that is located in a geographic region that is authorized to receive the requested streaming data. In this manner, if successful, a user is able to "get around" the geographic licensing rules.

Video streaming providers have become aware of this practice of getting around geographic licensing rules and have taken steps to prevent this practice from happening. The way that they prevent this practice from happening is by keeping a list (i.e., a blacklist) of IP addresses associated with VPN servers. In this manner, if a video streaming provider receives a request to stream data from an IP address on the blacklist, the video streaming provider simply refuses to stream data to that address.

In FIG. 2, a client device 202 communicating with the network via a VPN client. Initially, FIG. 2 illustrates that client 202 wishes to communicate with remote server 160. As shown, client 202 may be, for example, a mobile communications device that wirelessly communicates with network 135 via one or more access points (that may include Ethernet, modem, cellular, Wi-Fi, etc.). ISP 135 and ISP 136 may each permit public access or restricted access. As an example, ISP 135 may include a communications network that is typically accessed over a wired connection (i.e. COMCAST), while ISP 136 may include a communications network that is accessed by cellular communications provider (i.e. T-MOBILE). Alternatively, or in addition, an ISP may be provided that allows both forms of communication and perhaps another form of communication. ISP 135 and ISP 136 are shown coupled to Internet 140 through communication protocols that are well known to one of ordinary skill in the art. In one example, ISP 135 and ISP 136 interface with Internet 140 via a fiber-optic or Ethernet Internet connection.

While in one example ISP 136 is accessed by a cellular access point, ISP 136 may be accessed via other methods alternatively or as well, such as a LAN (e.g., a wireless home network), a combination of wired and/or wireless connections, and perhaps one or more intervening networks (such as a wide area network) so that access to Internet 140 may be obtained.

In the example above, a user may use client 202 for voice communication. Assume client 202 is a cell phone such as a smartphone, and communication occurs via a Voice over IP (VoIP) application. Client applications 110 communicate with ISP 135, ISP 136, or both (alternatively or simultaneously using technology such as channel bonding) via one or more access points separately or combined and a digitized form of the user's voice is then transmitted to Internet 140. From Internet 140, the data that represents the user's voice is transmitted to remote server 170. From remote server 170, the data may be transmitted to another user (not shown) so that voice communication between the two users may occur.

In another embodiment, a user may use client 202 for secure voice communication. Data from application 110 enters VPN client 220 via driver/receiver 221. Optional routing module 222 may optionally route data to either optional local proxy 224 or encap/decap module 223. Voice communication data is encapsulated (which may or may not include encryption) via encapsulate/decapsulate (encap/decap) module 223. Data from local proxy 224 is forwarded to driver/receiver 241 via port-298. Data from encap/decap module 223 is forwarded to diver/receiver 241 via port 299. Encapsulated data is then transmitted to ISP 135 (and/or ISP 136) via one or more access points before reaching Internet 140. From Internet 140, the encapsulated data (i.e., the encapsulated voice communication data) is transmitted to VPN server 250. Data is then decapsulated (which may or may not include decryption) via decapsulate/encapsulate (decap/encap) module 252 before being retransmitted to Internet 140 and remote server 170. From remote server 170, the data may be transmitted to another user (not shown) so that voice communication between two users may occur via a VPN.

In another embodiment, client 202 streams video data from remote server 160. Client 202 requests the video data from remote server 160 by transmitting a request through ISP 135 (and/or ISP 136) and Internet 140. Remote server 160 responds to the request by transmitting video via Internet 140, and back to ISP 135 (and/or ISP 136), so that it is eventually received by client 202. Such video streaming occurs outside of a VPN. The request to stream data may or may not be proceeded by a DNS request and processed by DNS server 180 to provide the IP address of remote server 160

In yet another example, remote server 160 serves two purposes: first, it is used as the source of streaming data (inside or outside a VPN) and second, it is used in combination with data that has been transmitted via the VPN.

In another example, data is transmitted via a VPN 250, and further data is transmitted outside of the VPN 250 (or outside of the VPN on another VPN). The data may be transmitted to at least two different servers (a remote server 170 and a VPN server 250). Alternatively, the data transmitted via the VPN 250 and outside of the VPN 250 (or outside on another VPN) may be transmitted to the same server.

In the above description, when the phrase "outside of the VPN" is used, this may include non-encapsulated/unencrypted data (i.e., data not encapsulated/encrypted by a VPN) and/or encapsulated/encrypted data that has been encapsulated/encrypted by another VPN.

Turning back to FIG. 2, application(s) 110 participate in communications that include Internet 140. In particular, application(s) 110 participate in communications that include VPN client 220. At least one type of communication that includes VPN client 220 also includes encapsulation/encryption. At least another type of communication that includes VPN client 220 omits encapsulation/encryption (at least by VPN client 220).

First, a description is provided of communication that includes VPN client 220 and that omits encapsulation/encryption (at least by VPN client 220).

VPN client 220 includes driver (driver/receiver) 221 that receives data from one or more applications 110. Driver 221 may be, for example, a tunnel/tap (TUN/TAP) driver.

A request for data (such as a request for data streaming) to be returned to application 110 (or the act of providing data) is transmitted from driver 221 and is received by routing module 222. The purpose of routing module 222 is to determine whether the request for data will be encapsulated (for purposes of being transmitted via the VPN) or whether the request for data will be transmitted to local proxy 224 and not encapsulated (at least within VPN client 220). In addition, when the request for data that is transmitted via the VPN arrives at its destination, the destination is advised that the source of the data was a VPN server 250 (and not the actual source of the data) because the destination receives the IP address of the VPN server as the source, client 202 (the actual source of the data) may be hidden to the destination as the destination will only "see" the IP address associated with the VPN server 250. By contrast, when a request for data that is not transmitted via the VPN, arrives at its destination, the destinations "sees" that the source of the data was client 202.

Among other things, when the request for data (or data, itself) has been received by routing module 222, routing module directs the request in one of two separate directions depending upon user selection.

The first scenario to be described is with a VPN enabled. When a VPN is enabled, routing module 222 routes the request for data to VPN server 250 via encap/decap 223. From VPN server 250, the request for data is further forwarded depending upon whether or not the request for data is a DNS request. If the request for data is a DNS request, VPN server 250 routes the request to DNS server 180. If the request for data is a data (non-DNS) request, VPN server 250 routes the request to remote server 160. If the request is received by DNS server 180, DNS server 180 resolves the DNS request and transmits the corresponding IP address to VPN server 250. VPN server 250 then transmits the IP address via port 299 to encap/decap 223. The IP address is subsequently transmitted to driver/receiver 221 and back to application 110 that initiated the DNS request. If the request is received by remote server 160, remote server 160 responds to the request by transmitting data (e.g., streaming data) via driver/receiver 232 and port 298 to local proxy 224. The data is subsequently transmitted to driver receiver 221 and back to application 110 that initiated the data request.

For purposes of explanation, a data request (i.e., to stream video data) will be broken down into two separate operations (as an example). The first is a DNS request to a DNS server (to obtain the IP address associated with a domain name of a server where requests for streaming data are serviced). The second is an IP request or the "data fetch" (in which the IP address obtained from the DNS request is used to request that a server provide data). In some situations, the first step is not performed because the IP address is already available for the data fetch. This situation may occur if the IP address associated with a domain name has been cached.

Figure 3:
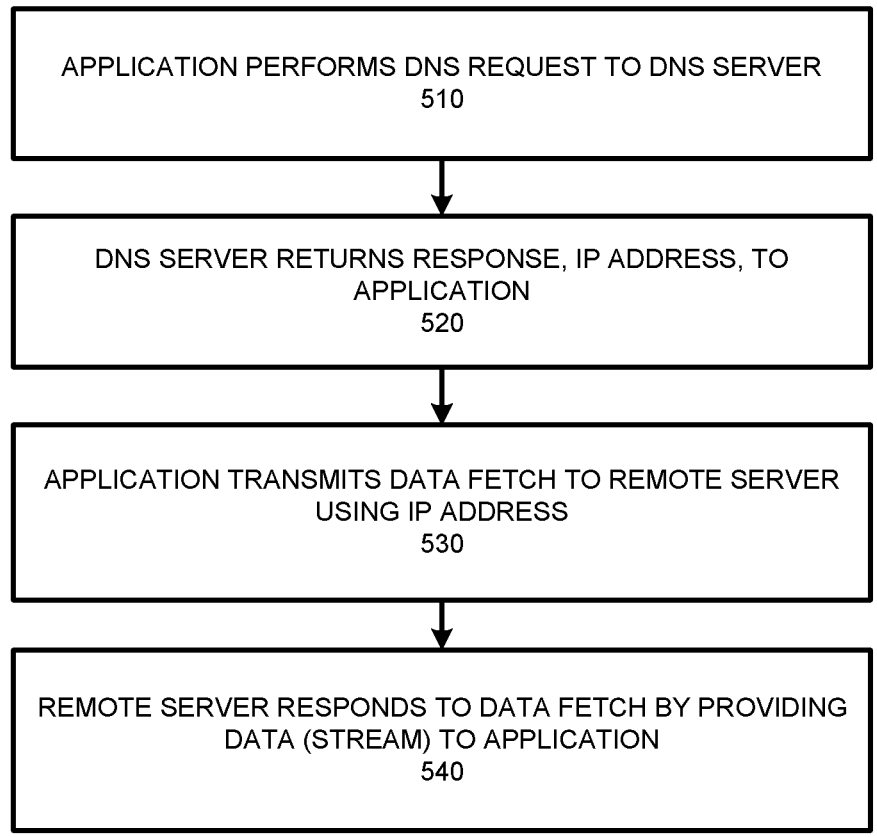
FIG. 3 is a flow chart diagram that illustrates operation of domain name service (DNS).

More specifically, when application 110 requests data from a remote server, there are actually several operations that may be involved. Some of these operations may, however, be omitted (for example, if IP addresses corresponding to domain names are cached). The first is "DNS resolution" in which application 110 requests data from a remote server with an associated domain name, but before the request for data can be sent to the remote server, the domain name needs to be "looked up" on a DNS server 180 to identify the IP address of the remote server. The second step is the "data fetch" in which, after the IP address of the remote server has been identified by the DNS server 180, the remote server is communicated with based on its IP address to provide the data that is sought. In some situations, the first step is omitted. Each of these operations includes two sub-operations: a) application 110 makes a request (which is forwarded to a DNS server in the first operation and to the remote server in the second operation); and b) the server that is being communicated with (a DNS server in the first operation and the remote server in the second operation) responds to a request and provides data to application 110. Thus, there are four operations (or two operations if the first two operations are omitted) as illustrated in the flow chart diagram included in FIG. 3: 510: application 110 makes a DNS request to the DNS server, 520: the DNS server returns the IP address of remote server 170 to application 110, 530: the application transmits the data fetch to remote server 170 using IP address obtained in 520, and 540: the remote server 170 responds to the data fetch by providing data (or streaming data) to application 110.

In one embodiment, it is during 510 that a determination is made as to whether 520-540 should occur inside or outside of VPN. Once that determination is made at 510, that decision can be applied to 520, 530 and 540. In order to apply that decision at 520, 530 and 540, data is desirably retained so that routing within (or outside of) a VPN can be selected. This process is described below.

As an example, the data that is evaluated by routing module 222 may be a DNS request. Routing module 222 may include a list (an "allowed" list referred to hereafter as the "non-VPN" list) of domain names. Alternatively, a "prohibited" list may be used. If the DNS request that routing module 222 receives is to resolve a domain name on the non-VPN list, then routing module 222 makes an initial assumption that the DNS request is being made to request streaming data from a destination that desirably should not go through the VPN. By saying "not go through the VPN," this may mean not going through any VPN. Alternatively, this may mean not going through the VPN that is managed by VPN client 220.

More specifically, if the DNS request received by routing module 220 includes a domain name that is on the non-VPN list, the DNS request is transmitted to a DNS server 180 for resolution via the "non-VPN" route. Alternatively, the DNS request may be transmitted via a default route, or via a user-selected route. As an example, in order to transmit the DNS request to a DNS server 180 via a non-VPN route, routing module 222 forwards the DNS request to local proxy 224, then to ISP 135 (via LAN 130 or via an access point such as a cellular connection), and then to Internet 140.

Again, note that the DNS request is transmitted outside of the VPN associated with VPN client 220. From Internet 140, the DNS request is forwarded to DNS server 180 as would be known to one of ordinary skill in the art. DNS server resolves the DNS request by identifying an IP address (or multiple IP addresses) associated with the DNS request. After the DNS request is resolved, the identified IP address (es) is returned to VPN client 220.

Before passing the DNS request from routing module 222 to local proxy 224, routing module 222 optionally notes the domain name that was in the DNS request and notes the IP address that is returned when the DNS request is resolved. Alternatively, both the domain name and the corresponding IP address may be noted when the DNS request is resolved. This information will be used for the routing decision (whether the data fetch should occur inside or outside the VPN) when the subsequent data fetch occurs. This is merely exemplary as in other situations other information may be used or retained instead of or in addition to domain names and/or IP addresses to make routing decisions (i.e., whether the data fetch should occur inside or outside the VPN). Other information includes, for example, SNI extensions and port number. The mechanism for using retained information to route a data transmission inside or outside the VPN is further described below.

The decision of whether to route the DNS request through the VPN can be based on a variety of different factors: the domain name that is being resolved, the IP address of the DNS server, a default route, a user selected route, etc.

As an example, a default may be for all DNS requests to be routed outside of the VPN. For example, all DNS requests are routed through local proxy 224, and after the DNS request is resolved (and the IP address of the domain name is returned), subsequent data fetches are routed in the VPN 250 or outside of the VPN 250, depending, for example, upon the domain name that was resolved. While the domain name (included in the DNS request) may be used to determine whether the subsequent data fetch should occur within or outside of the VPN, this is merely exemplary, as other data may be used to make that determination, such as SNI extensions and port numbers.

VPN client 220 receives the IP address from DNS server 180 in response to the DNS request and, in one embodiment, returns the IP address to application 110 in the manner in which the DNS request was made to DNS server 180. For example, if the DNS request was made via a VPN 250, then the IP address obtained when resolving the DNS request is delivered to application 110 via VPN 250. Conversely, if the DNS request was made outside of a VPN, then the IP address obtained when resolving the DNS request is delivered to application 110 outside of a VPN. A combination of making the DNS request and receiving the IP address over different routes is also contemplated.

To achieve the above objective, IP addresses received from a DNS server are transmitted through Internet 140, ISP 135 (or 136), and an intermediate point (e.g., cellular access point, LAN 130, etc.) before reaching VPN client 220. From there, the driver/receiver 241 receives the IP address from DNS server 180 and passes the IP address to application(s) 110.

If the DNS request was transmitted via VPN 250, then the IP address provided in response may travel along the tunnel used for the DNS request, and the IP address is forwarded to encap/decap 223 for decapsulation. After being decapsulated, the IP address is delivered to application 110 via driver/receiver 221. Conversely, if the DNS request was transmitted outside of a VPN, then the IP address may be transmitted along the tunnel used for the DNS request to local proxy 224, before delivering the IP address to driver/receiver 221 and application 110 (without performing decapsulation).

As explained below, when the DNS request returns an IP address, that IP address is stored in VPN client 220, along with either the domain name that resolved to that IP address, whether further communication with that IP address should (or should not) be over a VPN, both, or other data (i.e., port number). In this manner, when application 110 requests further data (the data fetch) from the IP address returned during DNS resolution, a decision can be made as to whether to forward the further data request or data fetch (and subsequent response) within the VPN or outside the VPN.

Application 110 may be any application that is executing on client 202. Exemplary applications include browsers and other applications (or combination thereof).

The present explanation describes the use of an "approved" list (with the regard to the non-VPN list). Alternatively, routing decisions can be made based on a "prohibited" list.

Application 110 next transmits a request to receive data ("further data request" or "data fetch"). In particular, application 110 requests further data from the server at the IP address that was obtained during DNS resolution. The further data request is transmitted to driver/receiver 221, which in turn passes the data request to routing module 222. Routing module 222 then determines over which path to route the further data request (along its way to the IP address obtained during DNS resolution).

The routing of the further data request may depend upon whether the DNS request (the resolution thereof resulting in DNS server 180 providing an IP address to routing module 222) was transmitted to DNS server 180 in VPN 250 or outside VPN 250. Alternatively, the routing of the further data request may be based upon the domain name included in the DNS request (and may be independent of whether the DNS request itself was transmitted in a VPN or outside a VPN).

If the DNS request was for a domain name on the non-VPN list, routing module 222 forwards the further data request (after DNS resolution, and with the IP address obtained during DNS resolution) to local proxy 224. Local proxy 224 then forwards the further data request to remote server 160. Again, this further data request is directed to the IP address that was returned by the DNS server after the DNS request was resolved. The further request may be, for example, for remote server 160 to provide streaming video. Thus, because the DNS request went through local proxy 224 (as opposed to encapsulation module 223), the further data request does not go through the VPN associated with VPN client 220. Instead, the further data request goes to ISP 135 and Internet 140 via local proxy 224, and with the destination IP address that was obtained when the DNS request was resolved. From Internet 140, the further data request is forwarded to remote server 160.

Conversely, if the DNS request was not for a domain name on the non-VPN list (i.e., the request was for a domain name where transmission over a VPN is desired), the further data request is forwarded to encap/decap 223 before being forwarded to VPN server 250 for decapsulation and further forwarding.

If the routing of the further request is based on whether the DNS request itself was transmitted inside or outside the VPN, that information may be recorded, and the further data request may simply be routed the same way (VPN or non-VPN) as the DNS request.

In some situations, whether to send the further request over the VPN is independent of whether the DNS request was sent over the VPN. Thus, the routing of the further request may be based on the domain name included in the DNS request, the IP address that was provided when the DNS request was resolved, both, or some other data field (e.g., port number).

Returning to the situation in which the further data request is for application 110 to be provided with requested data outside of the VPN, remote server 160 desirably includes the data that is requested by application 110. In an exemplary embodiment of the present invention, the requested data is streaming data. In a further exemplary embodiment of the present invention, the requested data is video streaming data from a video streaming provider. While such data is not considered to be "real time" streaming (such as live sports or video conferences), such data is still typically referred to as streaming data.

In some situations, users communicate with the Internet over one or more types of connections, including cellular, Wi-Fi, Ethernet, Cable Provider, Satellite, etc. Some of these forms of communication are available to a consumer on an "unlimited" basis, meaning that large amounts of data may be transmitted and received by a consumer's device for a fixed fee. Above a very high threshold amount, the ISP may begin to throttle data in order to reduce data usage. Other forms of communication may be on a "pay as you" go plan. In such plans, a certain number of gigabytes of data are pre-purchased, and when those gigabytes of data have been "used up," the gigabytes of data need to be "replenished" for communication to continue. Yet other forms of communication include a monthly fee for a set amount of data. Once that set amount of data has been used, the consumer is billed for "overages" that can become very expensive. In yet other forms of communication, a consumer may pay a preset fee for a set amount of data on a "home" network, but communication outside of that network (sometimes referred to as "roaming") results in additional charges. If the roaming occurs in a foreign country, roaming charges of several dollars per minute are possible.

Consumers like predictability in the bills that they receive and/or amounts that they pay for Internet communication. When consumer expectations are not met, consumers may become very unhappy with their service providers. In addition, exceeding data usage thresholds may have significant economic consequences.

One solution is to provide multiple thresholds of data usage and to take actions based on those multiple thresholds being crossed. The thresholds may be related, for example, to an amount of data that is used in a time period, although thresholds related to other parameters (e.g., amount of time of device use) are contemplated. Furthermore, as each threshold is exceeded, a different type of action may be taken to ensure proper data consumption actions are being managed.

For example, assume a scenario in which a consumer has paid for 15 GB of cellular data per monthly billing period, and each additional gigabyte of cellular data is billed to the consumer after the consumer exceeds his/her allotment (e.g., 15 GB) at a first value rate per GB. In such a situation, a consumer may wish to avoid exceeding the 15 GB per month threshold. One way to discourage a consumer from exceeding 15 GB (in this example) is to create an application that identifies multiple thresholds, and to take different actions depending upon which threshold is exceeded. For example, once 13 GB of cellular data usage has occurred in a monthly billing period, cellular data transfer on the consumer's device may be throttled to 80% of the maximum amount. Furthermore, once 14 GB of cellular data usage has occurred in a monthly billing period, cellular data transfer on the consumer's device may be throttled to 50% of the same maximum amount. Once 15 GB of cellular data usage has occurred in a monthly billing period, cellular data transfer on the consumer's device may stopped for the remainder of the monthly billing period. Alternatively, at 15 GB of usage, cellular data transfer may be paused, subject to a warning message provided to the consumer and the consumer enabling an additional cellular data transfer.

The advantages of the above scenario are several. First, the increased throttling of data discourages a user from using cellular data. As the amount of cellular data used gets closer to the threshold at which overage charges begin to accrue, the consumer receives progressively greater amounts of discouragement to use cellular data, such as prompts to quit, cut-off streaming actions during a live stream session, etc. As a result, the user may use his/her device less, or the user will make a greater attempt to use an alternative form of Internet access, such as Wi-Fi instead of cellular. Second, by throttling data, less data is used within a time period than occurs without throttling. In this manner, the amount of prepaid data available to a consumer within a billing cycle is effectively "stretched out," with the hopes that the overage data amount will not be reached until after the present billing cycle has completed.

Throttling is accomplished in various manners that are known to one of ordinary skill in the art. In one example, with a TCP connection, TCP adapts to bandwidth using the window/ACK mechanism. By either delaying acknowledgement of packet reception, or by dropping packets, TCP may automatically adjust to either scenario by reducing a transfer speed. Another way to limit bandwidth is by limiting bandwidth to 'N' bytes per second on the TCP/UDP port. Another way to limit bandwidth is to transfer data through a VPN, and to instruct the VPN client application of the client device and/or the VPN server to limit bandwidth. As a further alternative, bandwidth limiting can be built above the UDP layer. As another alternative, bandwidth limiting can be accomplished using a general-purpose transport layer network protocol such as QUIC.

Figure 4:
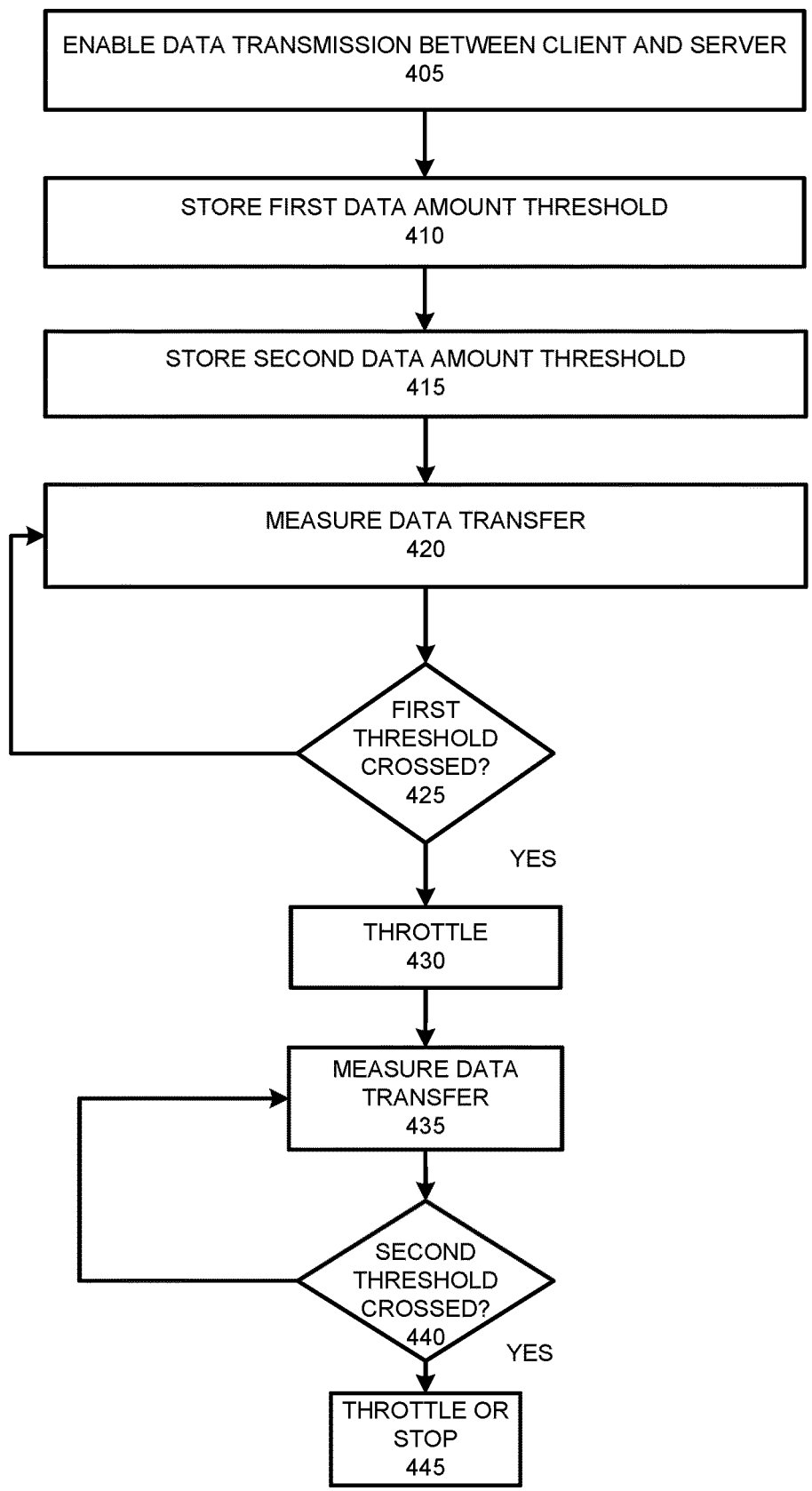
FIG. 4 is a flow chart diagram that illustrates another exemplary embodiment.

FIG. 4 is a flowchart diagram that illustrates operation of an exemplary embodiment of the present invention. At step 405, data transmission between the client device and a server may be enabled. In one embodiment, the client device is client device 202. In another embodiment, the client device is VPN client 220. At 410, a first data amount threshold is stored. In the above example, the first data amount threshold is 13 GB. The amount may be less or more of a total amount of data used by a device over a period of time or a total amount of data used in a current session period of time. At 415, a second data amount threshold is stored. In the above example, the second data amount threshold is 14 GB. Those data amount thresholds may be predetermined and stored in memory. While not shown in FIG. 4, there may be a third data amount threshold, a fourth data amount threshold, etc. For illustrative purposes only, in the above example, a third data amount threshold might be 15 GB. Or, the first may be 5 GB, the second 7 GB, the third 9 GB and the fourth 11 GB, in a linear measurement approach of 2 GB per threshold. In another example, the data usage may be non-linear and may start later, such as at 8 GB, and then 11 GB, then 12 GB and 13 GB. However, the purpose is achieved of not exceeding a maximum amount of data, the data thresholds may be set accordingly to accommodate the objective.

At 420, a data transfer rate on one or more connections is measured. This may be accomplished by measuring an amount of data that is transferred between two points over a predetermined time period. An exemplary time period may be one second. This may also include determining a total amount of time of the session to estimate the total amount of data transferred. For example, if 100 Mbps is used for a measure minute, then the amount of total GBs are readily identified. At 425, a determination is made as to whether the first data amount threshold has been crossed. If the first data amount threshold has not been crossed, then processing proceeds back to 420. Processing can loop through 420 and 425 until the first threshold is crossed. If the first data amount threshold is crossed, then processing proceeds to step 430 in which the data is throttled by some amount. It may be prudent to throttle by some first amount, such as 50 Mbps, or a larger or smaller amount, or 100 percent so the data exchange is forced to use another channel during the session, such as Wi-Fi and not cellular.

The throttle operation 430 and a throttle (or stop) operation 445 may both be administered. At each respective throttling operation, the amount of throttling may be the same, or the amount of throttling may be different. In the above example, in the first throttling, the data transfer rate is reduced to 80% of the non-throttled value (i.e., 20% less than the original value). In the example above, in the second throttling, the data transfer rate is reduced to 50% of the non-throttled value (i.e., 50 percent less than the original value). The above example may also include a third step at which data transmission is stopped, or data transmission is paused until a user allows data transmission to continue (in the above example, the second operation includes more throttling than the first, but not a complete pause of communication).

Continuing with the above explanation, throttling occurs at 430. Once throttling has begun, processing proceeds to 435. At 435, a data transfer amount is again measured. At 440, the amount of data transferred within a time period (e.g., a billing cycle, 24 hour period, a number of days, minutes etc.) is measured. If the second threshold has been crossed, then processing proceeds to 445. If the second threshold has not been crossed, then processing proceeds to 435 so the amount of data transfer can again be measured.

In operation 445 data is throttled or stopped, depending upon whether there are additional thresholds. In one exemplary embodiment, data transmission is stopped until, for example, the billing cycle has ended. In another exemplary embodiment, data transmission is stopped until the user provides further instructions. For example, a pop-up display can appear indicating that a threshold has been reached and the user can press a virtual button if the user desires further data transmission despite the fact that a threshold has been reached. Automatic action may occur too, such as less data being used, connection is dropped, a channel is shutdown/opened to compensate, etc.

A user may optionally be given the ability to manually override the software and stop throttling even though the billing cycle has not ended. In a further exemplary embodiment, once a billing cycle has ended, throttling is removed and processing resumes at 420. Throttling may then be reintroduced depending upon, for example, the outcomes of 425 and 440.

Figure 5:
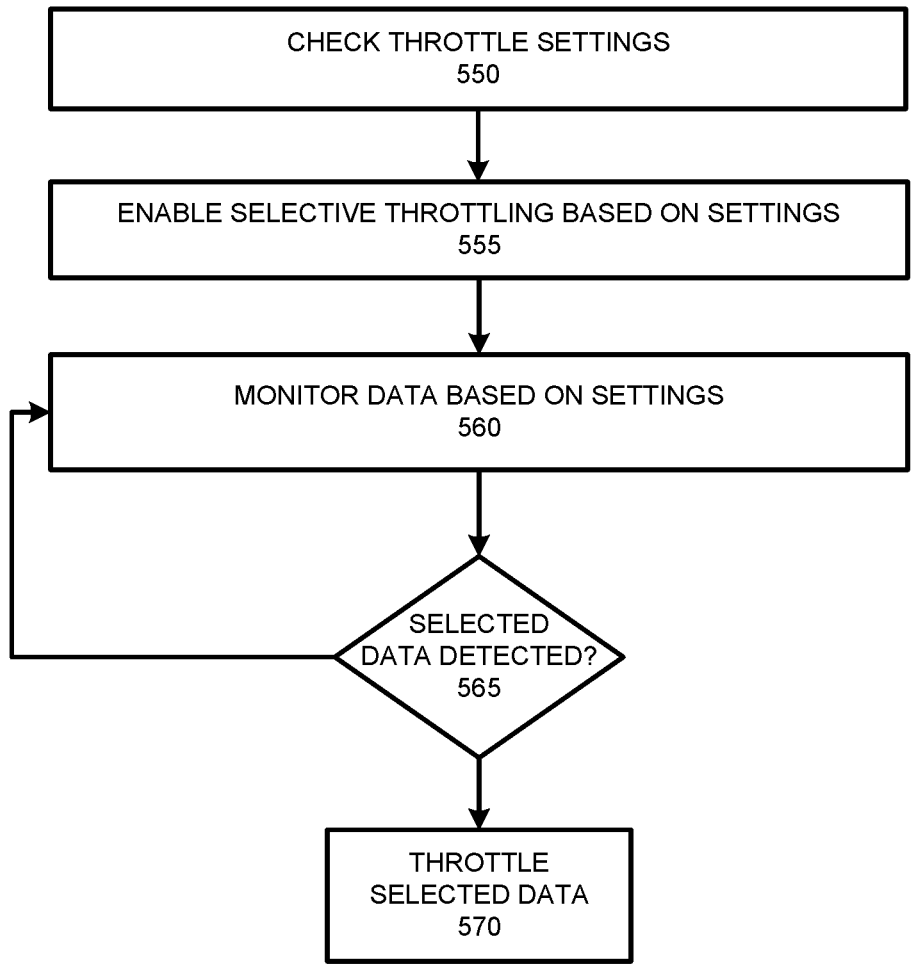
FIG. 5 is a flow chart diagram that illustrates yet another exemplary embodiment.

FIG. 5 is a flowchart diagram that illustrates optional steps that may be performed in accordance with a further exemplary embodiment of the present invention.

In one exemplary embodiment, it is possible to enter throttle settings. The throttle settings can be remotely entered in an automatic manner, or they may be entered locally from a user interface.

At 550, throttle settings are checked to identify their existence and to apply those to a current application, and at 555 selective throttling is enabled based on settings. The settings may be, for example, the total number of thresholds, the respective event that occurs when a threshold is crossed, the operations that are performed after the threshold is crossed, and/or the type(s) of data that is being throttled. These are merely examples of possible settings, and one or more settings may be included. At step 560, data transmitted between a client and a server is monitored based on the settings associated with operations 550 and 555 above. At optional operation 565, data is evaluated to determine whether it is the type(s) of data that should be identified as being throttled during 555. If selected data has not been detected, then processing proceeds to 550. Otherwise, processing proceeds to 570 and the selected data is throttled in accordance with the throttle settings. One or more of the aforementioned steps may be optional.

In one exemplary embodiment of the present invention, as each threshold is passed, data is throttled by respectively greater amounts in a linear (same amount each time) or non-linear manner (varying amounts each time). In one embodiment, after passing a first threshold, data is throttled by a percentage (of non-throttled speed). And after passing a second threshold, data transmission is paused. In another embodiment, there are multiple thresholds and while data is throttled for progressively greater amounts as each threshold is crossed, 100% throttling does not occur. In another embodiment, there is throttling at a first threshold, and at a second or subsequent threshold data transmission is stopped (for example until authorized to resume as a result of the user interacting with a pop-up window, or after the current billing period has expired). In the case of multiple channels being used concurrently, the Wi-Fi signal and corresponding data channel may be optimized to maintain a specific data rate and/or to increase the Wi-Fi data rate as the cellular channel(s) are reduced by the first and/or second throttle amounts. In one example, after the first threshold is reached, a Wi-Fi channel is used to produce a larger data transfer amount than was used previously. This increase will coincide with a decrease in the amount of data used on the cellular channel.

In another exemplary embodiment different types of data are throttled as each threshold is passed. For example, short burst data (such as an e-mail, for example) is throttled at a first threshold while video streaming data is throttled as a second threshold.

In accordance with a further exemplary embodiment of the present invention, some data is throttled or stopped while other data is not throttled or stopped. Examples of types of data that are selectively throttled or stopped include video data, audio data, operating system updates, real-time streaming, streaming that is not real-time (such as on-demand movies). Thus, in this exemplary embodiment, applications that consume relatively large amounts of data may be throttled while applications that consume relatively small amounts of data are allowed to continue without throttling because such data transfer has a negligible amount on the total amount of data used.

In another exemplary embodiment, a combination of a throttling amount and type of data that is throttled varies from threshold to threshold. Or, at a first threshold, only one of type of data is throttled but at a second threshold, all data is throttled, and at a different amount than at the first threshold.

Figure 6:
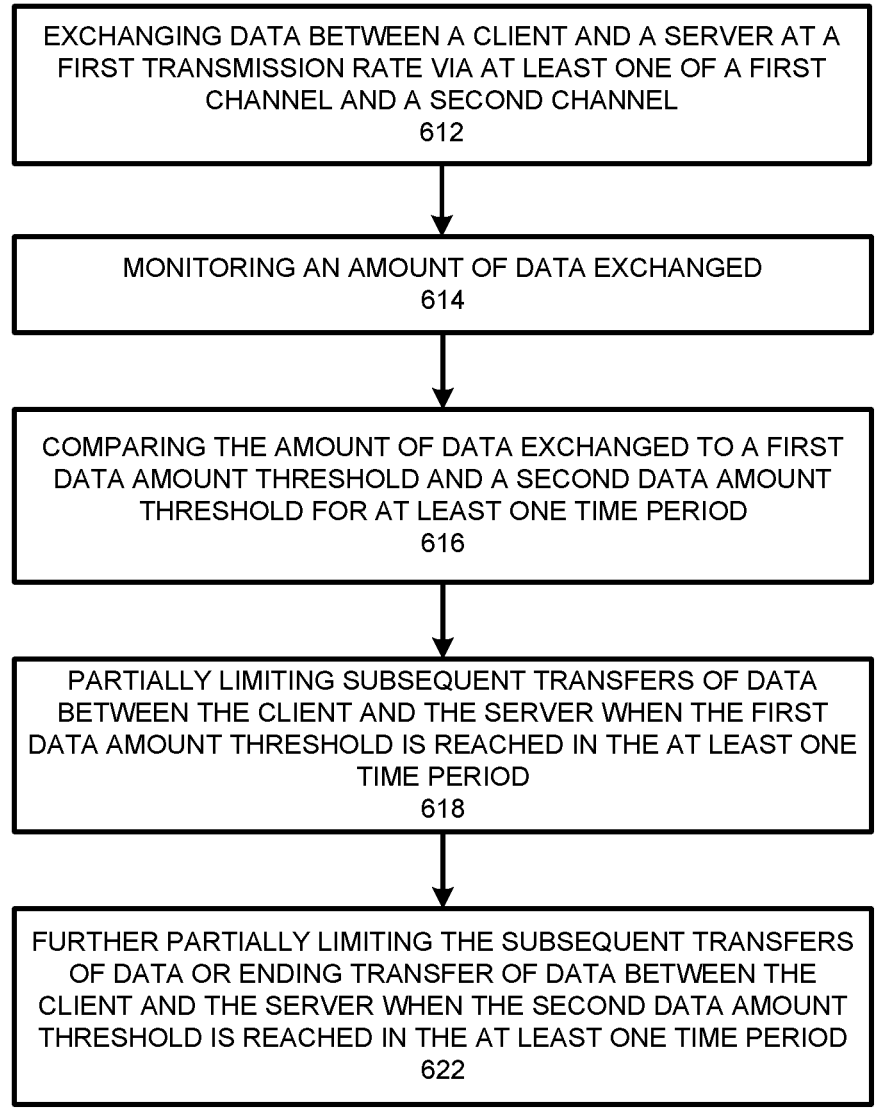
FIG. 6 is a flow chart diagram that illustrates still another exemplary embodiment.

FIG. 6 illustrates an example method of operation. One example method of operation may include exchanging data between a client and a server at a first transmission rate via at least one of a first channel and a second channel 612, monitoring an amount of data exchanged 614, comparing the amount of data exchanged to a first data amount threshold and a second data amount threshold for at least one time period 616, partially limiting subsequent transfers of data between the client and the server when the first data amount threshold is reached in the at least one time period 618, further partially limiting the subsequent transfers of data or ending transfer of data between the client and the server when the second data amount threshold is reached in the at least one time period 622.

The example process may also include partial limiting and the further partial limiting being performed to the first channel. The example process may also include the partial limiting is performed to the first channel and the further partial limiting is performed to the second channel. The example process may also include the monitoring of the amount of data exchanged is being performed to both the first and the second channels. The example process may also include the monitoring of the amount of data exchanged is being performed only to the first channel. The example process may also include partial limiting being performed only to the first channel and the further partial limiting being performed to the first channel and the second channel. In one example, the first channel is cellular and the second channel is Wi-Fi.

The example process may also include further partial limiting by limiting a data transfer rate by an amount that is greater than a limit amount of data transfer applied by the partial limiting transfer. The further partial limiting transfer limits the data transfer rate by an amount that is the same as an amount of limiting transfer provided by the partial limiting transfer. The exchanging the data via the at least one first channel and second channel includes at least one additional channel, and the first channel is cellular, the second channel is cellular and the at least one additional channel is a Wi-Fi channel. The partial limiting includes limiting the data rate to a fixed amount, and the further partial limiting includes limiting the subsequent amount of data transferred to a lower amount than the fixed amount.

In one example of limiting the data rate, the limiting of the data rate may be performed by a fixed amount that reduces the data rate by a margin, such as 10 percent. For example, a data rate of 100 Mbps would be limited by a fixed amount, such as 10 percent. In the event, that the data rate needs to be adjusted by a larger margin, the data rate could be limited to a fixed amount, such as 10 Mbps, thus reducing the data by 90 percent. By limiting the data rate to a lower value, such as 10 Mbps, the original data rate would not have to be identified and the rate would be statically assigned to a new data rate regardless of the original data rate.

The example process may also include partial limiting by limiting the data rate to a fixed amount, and the further partial limiting by limiting the subsequent amount of data transferred by a different fixed amount that is greater than the fixed amount.

The example process may also include using multiple instances of data rate reduction, such as three or more operations with three or more thresholds. The data rate reduction may be a linear reduction, such as 10 percent reduction a 'X' number of times, and/or a non-linear reduction such as 10 percent of the original data rate amount, then 20 percent of the original data rate amount, then 25 percent, etc., until zero data is permitted via the data sensitive channel, such as the cellular channel. Also, bonding between Wi-Fi and cellular may be used via the VPN and may include the Wi-Fi persevering as the dominant data channel when compared to the cellular data channel, also the Wi-Fi data rate may be throttled as well, and that include a different throttle data rate approach, such as shorter of periods of time, etc.

In one example, a time period used to measure data rate exchanged may include a plurality of time periods, and the plurality of time periods are not equal, or, are the same. The example process may also include the partially limiting transfer and the further partially limiting transfer as limiting all transfers for one common type of data and not limiting data for other types of data. The partially limiting transfer and the further partially limiting transfer may be for limiting different types of data. The types of data/traffic are selected from a list which includes streaming data, video, and audio. The time periods may be based on daily, monthly and hourly time limits, so the time periods of monitoring and measuring are different.

Selective throttling of data may be accomplished by transferring data between the client 202 and server 160/170 over different tunnels. In this manner, data transferred over one tunnel is throttled while data transferred over another tunnel is not throttled. The tunnels may be over one channel or each tunnel may be associated with a respectively different channel. Referring back to 550 of FIG. 5, client 202 may be provided with the identification of data that is to be throttled. Alternatively, client 202 may be provided with the identification of data that is not to be throttled. The identification may be provided locally (via a user interface) or remotely. In other words, throttling (or lack thereof) may be based on an allowed list or a "blocked" list of data types. Data identified as data to be throttled may then be directed over one tunnel while data identified as data to not be throttled may be directed over another tunnel. Data for either tunnel may be identified based on various parameters such as domain name, host name, IP address, port number, SNI, etc. Data for either tunnel may be identified based on characteristics of transmitted data, such as data quantity, frequency of data transmission, whether data is transmitted continuously or in spurts, etc. Multiple tunnels can be multiple physical tunnels, multiple virtual tunnels, or some combination thereof. The user can be presented with a user interface to select which data types are throttled when thresholds are crossed. Virtual buttons can be selected by a user to specify throttling behavior.

In another example embodiment, monthly or daily data usage maximums are introduced to provide multiple levels of data reduction for cellular channels or other data limited channels which are monitored for data use reduction to maintain optimization (e.g., reduced network resources, value analysis, etc.). Internet service providers (ISPs) or other data service providers may have certain data maximum usage values which are also used to reduce data usage over Wi-Fi channels in addition to cellular channels bonded to the Wi-Fi channels for use during a data use session.

In one example of limiting the data rate, the limiting of the data rate may be performed by a fixed amount that reduces the data rate by a certain margin, such as 10 percent. For example, a data rate of 100 Mbps would be limited by a fixed amount, such as 10 percent. In the event that the data rate needs to be adjusted by a larger margin, the data rate could be limited to a fixed amount, such as 10 Mbps, thus reducing the data by 90 percent. By limiting the data rate to a lower value, such as 10 Mbps, the original data rate would not have to be identified and the rate would be statically assigned to a new data rate regardless of the original data rate or an assigned data reduction rate.

In one example the partial limiting of a data rate includes limiting the data rate to a fixed amount, and the further partial limiting may include limiting the subsequent amount of data transferred by a different fixed amount that is greater than the fixed amount. There may also be additional instances of data rate reducing or increasing. The amount the data rate is increased or decreased may be a linear reduction, such 10 percent 'X' number of times based on an original data rate amount. Another approach is a nonlinear reduction, which increase the reduction rate by a larger amount each time or go back and from a larger amount to a smaller amount, such as 10 percent then 5 percent then 10 percent. etc., eventually the data rate will approach 0 Mbps for one or more channels, such as a data sensitive channel (i.e., cellular channel). The channel bonding between Wi-Fi and cellular may be managed by the VPN server and may include the Wi-Fi channel being maintained while the cellular channel data rate is decreased, also the Wi-Fi channel may be throttled as well, and that may include a different throttle approach, such as shorter periods of time, etc.

The time period that is used to modify a channel rate may be one time period or a plurality of time periods which are the same or different. During each time period the data reduction may be performed from a first set amount data rate multiple times until each time period expires. Also, the partially limiting transfer and further partially limiting transfer of data may be for one common type of data (e.g., streaming data), while other data types have consistent data rates. Alternatively, the data limiting may be for all data types or more than one data type. Other types of data which may be limited or maintained may be video, audio and application updates.

FIG. 7 is an example of a throttle table 700 in accordance with an exemplary embodiment of the present invention. Data type column 705 and threshold column 710 may be displayed to a user in a graphical user interface, along with virtual controls to enable/disable throttling when these data types are identified. The threshold column 710 allows a user to specify at what threshold throttling occurs for the specified data type. An optional column (not shown) allows a user to specify the amount of throttling to occur when a threshold is exceeded. The amount of throttling may be expressed, for example, as a percentage (e.g., full bandwidth availability for a data type is considered to be 100%, throttling to half that bandwidth is considered to be 50%).

Throttle table 700 may be partially or fully populated with values or binary attributes that when detected in data transferred between client and server, when the specified threshold is exceeded, and when selected by the user, results in data of a corresponding data type being throttled. Throttle table 700 is partially filled in as an example. Real time streaming is throttled at threshold one when data is being continuously streamed. When a website, such as 'WebSpyder' is communicated with and data transfer exceeds threshold two, throttling occurs. When the NETFLIX streaming service is initiated and threshold two is exceeded, throttling occurs, in this example. Note in the example of real time streaming, throttling is initiated based on the detection of continuously transmitted data (column 715), but in the example of NETFLIX streaming, throttling is initiated based on the detection of data values identified in throttle table 700 (such as detection of IP address, port, etc., in packet headers of transferred packets).

The above explanation has included examples in which various efforts are taken to improve streaming to a client such as a mobile device. It is understood, however, that the above examples may relate to the streaming of data to other devices such as to a server.

The above examples provide a technological improvement by discouraging overages and excessive data fees. The above examples may also apply to conservation of battery charge.

The above explanation has included multiple examples and multiple embodiments. It is understood to one of ordinary skill of the art that more than one of these examples and more than one of these embodiments can be combined in order to create further examples and embodiments. Also, disclosed features can be eliminated from various embodiments as desired. Also, some features of one embodiment may be combined with some features of another embodiment.

In an exemplary embodiment of the present invention a computer system may be included and/or operated within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system includes a processing device, a main memory (e.g., read-only memory (ROM), flash memory, dynamic random access memory (DRAM) (such as synchronous DRAM (SDRAM) or Rambus DRAM (RDRAM), etc.), a static memory (e.g., flash memory, static random access memory (SRAM), etc.), and a data storage device, which communicate with each other via a bus.

Processing device represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device may also be one or more special-purpose processing devices such as an application specific integrated circuit (ASIC), a field programmable gate array (FPGA), a digital signal processor (DSP), network processor, or the like. Processing device is configured to execute listings manager logic for performing the operations and operations discussed herein.

Computer system may further include a network interface device. Computer system also may include a video display unit (e.g., a liquid crystal display (LCD) or a cathode ray tube (CRT)), an alphanumeric input device (e.g., a keyboard), a cursor control device (e.g., a mouse), and a signal generation device (e.g., a speaker).

Data storage device may include a machine-readable storage medium (or more specifically a computer-readable storage medium) having one or more sets of instructions embodying any one or more of the methodologies of functions described herein. Data storage may also reside, completely or at least partially, within main memory and/or within processing device during execution thereof by computer system; main memory and processing device also constituting machine-readable storage media.

Virtual private network (VPN) device/server may indicate any similar system that encapsulates packets to transmit them to and from a client device and to and from a remote server. For example, a VPN may be a software defined network (SDN) or SD wide area network (SD-WAN), or a multi-path TCP (MPTCP) proxy device.

Machine-readable storage medium may also be used to store the device queue manager logic persistently. While a non-transitory machine-readable storage medium is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the aforementioned description, numerous details are set forth. It will be apparent, however, to one skilled in the art, that the disclosure may be practiced without these specific details. In some instances, well-known structures and devices are shown in block diagram form, rather than in detail, in order to avoid obscuring the disclosure.

The above explanation has included multiple examples and multiple embodiments. It is understood to one of ordinary skill of the art that more than one of these examples and more than one of these embodiments can be combined in order to create further examples and embodiments. Also, disclosed features can be eliminated from various embodiments as desired. Also, some features of one embodiment may be combined with some features of another embodiment.

Computer system may further include a network interface device. Computer system also may include a video display unit (e.g., a liquid crystal display (LCD) or a cathode ray tube (CRT)), an alphanumeric input device (e.g., a keyboard), a cursor control device (e.g., a mouse), and a signal generation device (e.g., a speaker).

A data storage device may include a machine-readable storage medium (or more specifically a computer-readable storage medium) having one or more sets of instructions embodying any one or more of the methodologies of functions described herein. The data storage may also reside, completely or at least partially, within main memory and/or within processing device during execution thereof by computer system; main memory and processing device also constituting machine-readable storage media.

Machine-readable storage medium may also be used to store the device queue manager logic persistently. While a non-transitory machine-readable storage medium is illustrated in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

Figure 8:
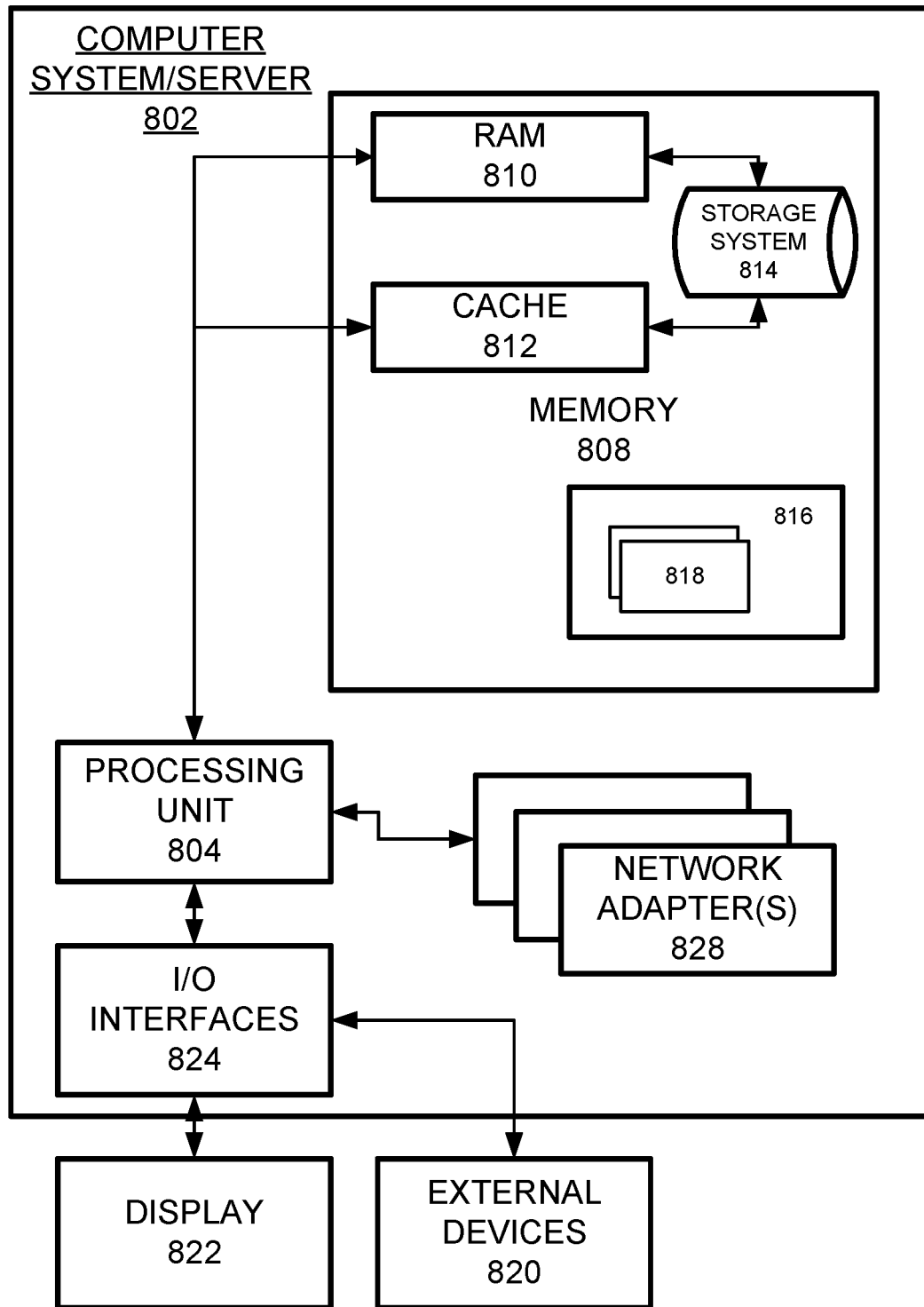
FIG. 8 is a system configuration configured to perform one or more processes associated with the exemplary embodiments.

FIG. 8 is a computer readable medium and corresponding system configuration of an example device(s) configured to perform one or more operations associated with exemplary embodiments of the present invention.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

FIG. 8 illustrates an example network entity device configured to store instructions, software, and corresponding hardware for executing the same according to example embodiments. FIG. 8 is not intended to suggest any limitation as to the scope of use or functionality of embodiments of the application described herein. Regardless, the computing node 800 is capable of being implemented and/or performing any of the functionality set forth hereinabove.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, rich clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As displayed in FIG. 8, computer system/server 802 in cloud computing node 800 is displayed in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not displayed and typically called a "hard drive"). Although not displayed, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter(s) 826. As depicted, network adapter(s) 826 communicates with the other components of computer system/server 802 via a bus. It should be understood that although not displayed, other hardware and/or software components could be used in conjunction with computer system/server 802. Examples include, but are not limited to: microcode, device drivers, redundant processing units, external disk drive arrays, RAID systems, tape drives, and data archival storage systems, etc.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

The invention claimed is:

1. A method comprising:
    monitoring an amount of data exchanged between a client device and a virtual private network (VPN) server via a bonded connection comprising a first channel and a second channel used to simultaneously transfer data between the client device and the VPN server;
    comparing the amount of data exchanged to a first data usage threshold and a second data usage threshold that is larger than the first data usage threshold;
    partially limiting a data rate of subsequent transfers of data between the client device and the VPN server on the bonded connection by a predetermined percentage less than the data rate when the first data usage threshold is reached;
    responsive to the partial limiting of the data rate of the subsequent transfers of data on the bonded connection, increasing a data rate of the second channel and reducing the data rate of the first channel based on the predetermined percentage less than the data rate; and
    further partially limiting the data rate of further subsequent transfers of data between the client device and the VPN server on the first channel by further reducing the data rate of the first channel by another predetermined percentage less than the data rate in addition to the predetermined percentage less than the data rate when the second data usage threshold is reached and simultaneously exchanging data on the bonded connection between the client device and the VPN server during the further subsequent transfers of data.

2. The method of claim 1, wherein the partial limiting is performed to the first channel and the further partial limiting is performed to the second channel.

3. The method of claim 1, wherein the monitoring of the amount of data exchanged is being performed to both the first and the second channels.

4. The method of claim 1, wherein the monitoring of the amount of data exchanged is being performed only to the first channel.

5. The method of claim 1, wherein the partial limiting is performed only to the first channel and the further partial limiting is performed to the first channel and the second channel.

6. The method of claim 1, wherein the first channel is cellular and second channel is Wi-Fi.

7. The method of claim 1, wherein the further partial limiting transfer limits a data transfer rate by an amount that is greater than the amount of data limit imposed by the data transfer rate applied by the partial limiting transfer.

8. The method of claim 1, wherein the further partial limiting transfer limits the data transfer rate by an amount that is the same as the amount of data limit imposed by the data transfer rate applied by the partial limiting transfer.

9. The method of claim 1, wherein the exchanging the data via the at least one first channel and second channel comprises at least one additional channel, and wherein the first channel is cellular, the second channel is cellular and the at least one additional channel is a Wi-Fi channel.

10. The method of claim 1, wherein the partial limiting comprises limiting the data rate to a fixed amount, and the further partial limiting comprises limiting the subsequent amount of data transferred to a lower amount than the fixed amount.

11. A system comprising:
a client device; and
a virtual private network (VPN) server
wherein the client device is configured to
monitor an amount of data exchange with the VPN server via a bonded connection comprising a first channel and a second channel used to simultaneously transfer data between the client device and the VPN server;
compare the amount of data exchanged to a first data usage threshold and a second data usage threshold that is larger than the first data usage threshold;
partially limit a data rate of subsequent transfers of data between the client device and the VPN server on the bonded connection by a predetermined percentage less than the data rate when the first data usage threshold is reached;
responsive to the partial limit of the data rate of the subsequent transfers of data on the bonded connection, increase a data rate of the second channel and reduce the data rate of the first channel based on the predetermined percentage less than the data rate; and
further partially limit the data rate of further subsequent transfers of data between the client device and the VPN server on the first channel by further reducing the data rate of the first channel by another predetermined percentage less than the data rate in addition to the predetermined percentage less than the data rate when the second data usage threshold is reached and simultaneously exchanging data on the bonded connection between the client device and the VPN server during the further subsequent transfers of data.

12. The system of claim 11, wherein the partial limiting is performed to the first channel and the further partial limiting is performed to the second channel.

13. The system of claim 11, wherein the monitor of the amount of data exchanged is being performed to both the first and the second channels.

14. The system of claim 11, wherein the monitor of the amount of data exchanged is being performed only to the first channel.

15. A non-transitory computer readable storage medium configured to store instructions that when executed cause a processor to perform:
monitoring an amount of data exchanged between a client device and a virtual private network (VPN) server via a bonded connection comprising a first channel and a second channel-used to simultaneously transfer data between the client device and the VPN server;
comparing the amount of data exchanged to a first data usage threshold and a second data usage threshold that is larger than the first data usage threshold;
partially limiting a data rate of subsequent transfers of data between the client device and the VPN server on the bonded connection by a predetermined percentage less than the data rate when the first data usage threshold is reached;
responsive to the partial limiting of the data rate of the subsequent transfers of data on the bonded connection, increasing a data rate of the second channel and reducing the data rate-of the first channel based on the predetermined percentage less than the data rate; and
further partially limiting the data rate of further subsequent transfers of data between the client device and the VPN server on the first channel by further reducing the data rate of the first channel by another predetermined percentage less than the data rate in addition to the predetermined percentage less than the data rate when the second data usage threshold is reached and simultaneously exchanging data on the bonded connection between the client device and the VPN server during the further subsequent transfers of data.

16. The non-transitory computer readable storage medium of claim 15, wherein the partial limiting is performed to the first channel and the further partial limiting is performed to the second channel.

17. The non-transitory computer readable storage medium of claim 15, wherein the monitoring of the amount of data exchanged is being performed to both the first and the second channels.

* * * * *